United States Patent [19]

Kuwahara et al.

[11] Patent Number: 5,670,107
[45] Date of Patent: Sep. 23, 1997

[54] METHOD FOR PRODUCING MAGNETIC RECORDING MEDIUM

[75] Inventors: Kenji Kuwahara, Ikoma; Kiyosi Takahasi, Ibaraki; Hideyuki Ueda, Takatsuki; Noriyasu Echigo, Ashiya; Mikio Murai, Hirakata; Masaru Odagiri, Kawanishi, all of Japan

[73] Assignee: Matsushita Electric Industrial Co., Ltd., Osaka-fu, Japan

[21] Appl. No.: 554,243

[22] Filed: Nov. 8, 1995

[30] Foreign Application Priority Data

Nov. 8, 1994 [JP] Japan .................................. 6-273656

[51] Int. Cl.$^6$ .................................................. B29C 71/02
[52] U.S. Cl. ...................... 264/234; 264/235; 264/235.6; 427/130
[58] Field of Search ........................ 427/130; 264/234, 264/235, 235.6, 345, 346

[56] References Cited

U.S. PATENT DOCUMENTS 4,474,832  10/1984  Shirahata et al. .................. 427/130

FOREIGN PATENT DOCUMENTS

| 0494678 | 7/1992 | European Pat. Off. . |
| 0535240 | 4/1993 | European Pat. Off. . |
| 59-77626 | 5/1984 | Japan . |
| 62-243127 | 10/1987 | Japan . |
| 4111225 | 4/1992 | Japan . |

*Primary Examiner*—James Derrington
*Attorney, Agent, or Firm*—Wenderoth, Lind & Ponack

[57] ABSTRACT

A magnetic recording medium produced by treating a magnetic recording medium which comprises a non-magnetic substrate and a magnetic layer formed on said substrate in an atmosphere kept at a temperature of at least 50° C., with applying a tension of 1 gf. or less per 10 mm width to said magnetic recording medium in a treating time which is in a range on or above a line having a slope of at least 5000 in terms of $\Delta \ln(L)/\Delta(1/T)$ and passing a point of 0.5 second at 100° C., when $\ln(L)$ is Arrhenius plotted against an inverse of an absolute temperature T (1/T), which medium has suppressed change of magnetic properties with time and improved corrosion resistance.

4 Claims, 3 Drawing Sheets

1

METHOD FOR PRODUCING MAGNETIC RECORDING MEDIUM

BACKGROUND OF THE INVENTION

1. Field of the Invention

The present invention relates to a method and apparatus for producing a magnetic recording medium. In particular, the present invention relates to a production of a magnetic recording medium which has good weathering reliability, particularly, which can minimize a skew of a reproduced image and the increase of an error rate due to a dimensional change of the magnetic recording medium such as a magnetic tape.

2. Description of the Related Art

With magnetic tapes which are mainly used as recording media in the magnetic recording field in these years, it is increasingly required to achieve a high image quality and reduction of a size and weight of a cassette tape recorder at the same time, and also to increase a recording density for data recording. To satisfy such requirements, study and development are vigorously made to achieve a high recording density including the improvement of a magnetic head. In particular, in the case of the cassette tape recorder, digitalization which suffers no decrease of image quality due to dubbing has been progressed first in the commercial use and then in home-use.

When the analog recorded magnetic tape is kept in a high temperature high humidity atmosphere, influence of elongation or shrinkage of the tape in a longitudinal direction on the reproduced image appears as a skew. To prevent the elongation or shrinkage of the tape in the longitudinal direction, it is proposed to adjust a thermal shrinkage factor of a non-magnetic substrate (see, for example, JP-A-59-77626) or to maintain a magnetic tape which is wound around a bobbin in a high temperature high humidity atmosphere (see, for example, JP-A-62-243127), and these measures reach a practically satisfactory level.

However, in the case of a digital recording magnetic tape, shift of a track caused by the elongation or shrinkage of the tape in the longitudinal direction results in decrease of a C/N ratio and increase of an error rate, and causes large disturbance of the reproduced image. This is remarkable, in particular, in the case of a narrow track pitch which is essential for increasing the recording density. Therefore, the further suppression of the elongation or shrinkage of the magnetic tape is unavoidable.

SUMMARY OF THE INVENTION

An object of the present invention is to provide a method for producing a magnetic recording medium, for example, a magnetic tape, by which elongation or shrinkage in the longitudinal direction is minimized.

Another object of the present invention is to provide an apparatus for producing a magnetic recording medium, for example, a magnetic tape, by which elongation or shrinkage in the longitudinal direction is minimized.

According to a first aspect of the present invention, there is provided a method for producing a magnetic recording medium comprising treating a magnetic recording medium which comprises a non-magnetic substrate and a magnetic layer formed on said substrate in an atmosphere kept at a temperature of at least 50° C., preferably from 50° C. to 150° C., more preferably from 70° C. to 120° C., with applying a tension of 1 gf. or less per 10 mm width to said magnetic recording medium in a treating time which is in a range on or above a line having a slope of at least 5000 in terms of $\Delta \ln(L)/\Delta(1/T)$ and passing a point of 0.5 second at 100° C. when a natural logarithm of a residence time L (hours) $\{\ln(L)\}$ is Arrhenius plotted against an inverse of an absolute temperature T (1/T) where $\Delta \ln(L)/\Delta(1/T)$ is derived from $\{\ln(L_1)-\ln(L_2)\}/\{(1/T_1)-(1/T_2)\}$ in which $L_1$ and $L_2$ are two different residence times at the absolute temperatures $T_1$ and $T_2$.

In the case of a thin metal film type magnetic recording medium, the production method comprises at least one step of the above treatment, and at least one step of passing said medium over a heated roll kept at a temperature of at least 60° C. with contacting said medium to said roll.

According to a second aspect of the present invention, there is provided an apparatus for producing a magnetic recording medium, comprising means for supplying a magnetic recording medium which comprises a non-magnetic substrate and a magnetic layer, means for maintaining said magnetic medium in an atmosphere kept at a temperature of at least 50° C., and means for adjusting a tension to be applied on said magnetic recording medium at 1 gf. or less per 10 mm width.

By the above treatment of the magnetic recording medium, the thermal shrinkage of the medium in the longitudinal direction is saturated. Accordingly, when the treated magnetic recording medium is kept in a high temperature atmosphere, it is not or hardly shrunk further, so that the dimensional stability of the medium in the longitudinal direction is maintained. Then, the shift of the track is minimized, and no or little increase of the error rate is found in the digital recording.

In the case of the thin metal film type magnetic recording medium, a bonding state between oxygen atoms and a ferromagnetic metal in the magnetic layer of the medium is stabilized by the treatment with the heated roll, so that change of its magnetic properties is suppressed, and corrosion resistance is improved.

DETAILED DESCRIPTION OF THE INVENTION

The present invention will be explained by making reference to the accompanying drawings.

Figure 1:
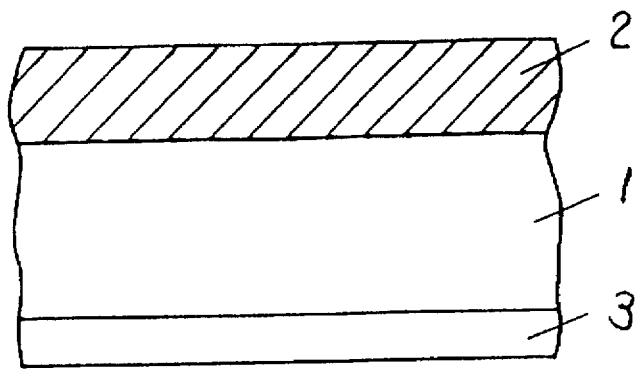
FIG. 1 is a schematic cross sectional view of a coating type magnetic recording medium.

FIG. 1 shows an example of a coating type magnetic recording medium to be treated and produced by the method of the present invention. A magnetic recording medium basically comprises a non-magnetic substrate 1, a coating type magnetic layer 2, and a back coat layer 3.

The non-magnetic substrate 1 may be made of any one of conventionally used materials as a non-magnetic substrate, for example, polyethylene terephthalate, polyethylene naphthalate, polyamide, polyimide, and so on. A thickness of the substrate 1 is usually from 2 to 20 μm.

The magnetic layer 2 may be formed by any one of conventional methods for forming a magnetic layer of the coating type magnetic recording medium. For example, the magnetic layer is formed by mixing magnetic powder, a binder and optional additives such as an antistatic agent, an abrasive, a dispersant, a lubricant, etc. in an organic solvent to obtain a magnetic paint containing the components in a designed ratio, coating the magnetic paint on one surface of the non-magnetic substrate, and drying the coated paint to evaporate the organic solvent. A thickness of the magnetic layer is usually from 1 to 5 µm.

Also the back coat layer 3 may be formed by a per se conventional method. For example, a binder resin such as a polyester resin or a polyurethane resin is mixed with carbon, calcium carbonate, nitrocellulose and so on, and the mixture is coated on the other surface of the non-magnetic substrate in substantially the same manner as in the formation of the magnetic layer and dried. A thickness of the back coat layer is usually from 0.3 to 1 µm.

Figure 2:
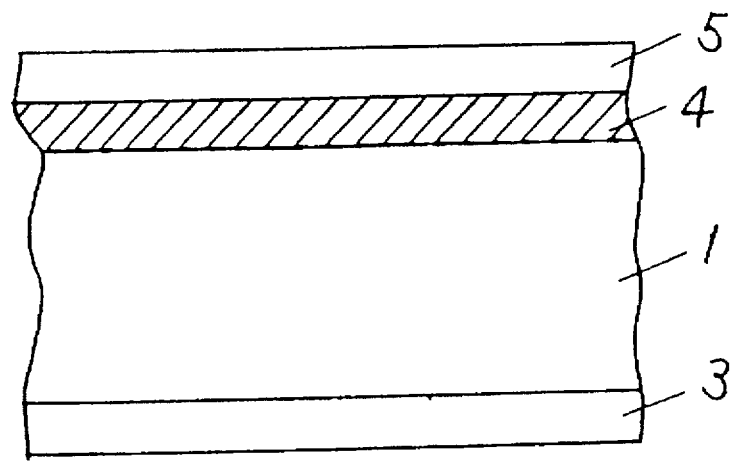
FIG. 2 is a schematic cross sectional view of a thin metal film type magnetic recording medium.

FIG. 2 shows an example of a thin magnetic metal type magnetic recording medium to be treated and produced by the method of the present invention. A magnetic recording medium basically comprises a non-magnetic substrate 1, a thin magnetic metal layer 4, a back coat layer 3, and a protective layer 5.

The substrate 1 and the back coat layer 3 may be the same as those used in the coating type magnetic recording medium of FIG. 1.

The thin magnetic layer 4 is formed from a ferromagnetic metal such as Co, Ni, Cr or their alloys such as Co-Ni-O, Co-Ni-Cr, Co-O, and so on, by a conventional method such as a vacuum deposition method. Its thickness is usually from 0.05 to 0.3 µm.

The protective layer 5 generally consists of a single layer of a lubricant, or a combination of a layer of a protective material and a layer of a lubricant. The lubricant layer and the layer of the protective material may be conventionally used ones. Examples of the lubricant are fluorine-containing carboxylic acids or a mixture of a fluorine-containing carboxylic acid and its ester or amine. Examples of the layer of the protective material are a $SiO_2$ layer, a plasma polymerized layer, a diamond-like carbon layer, and so on.

Figure 3:
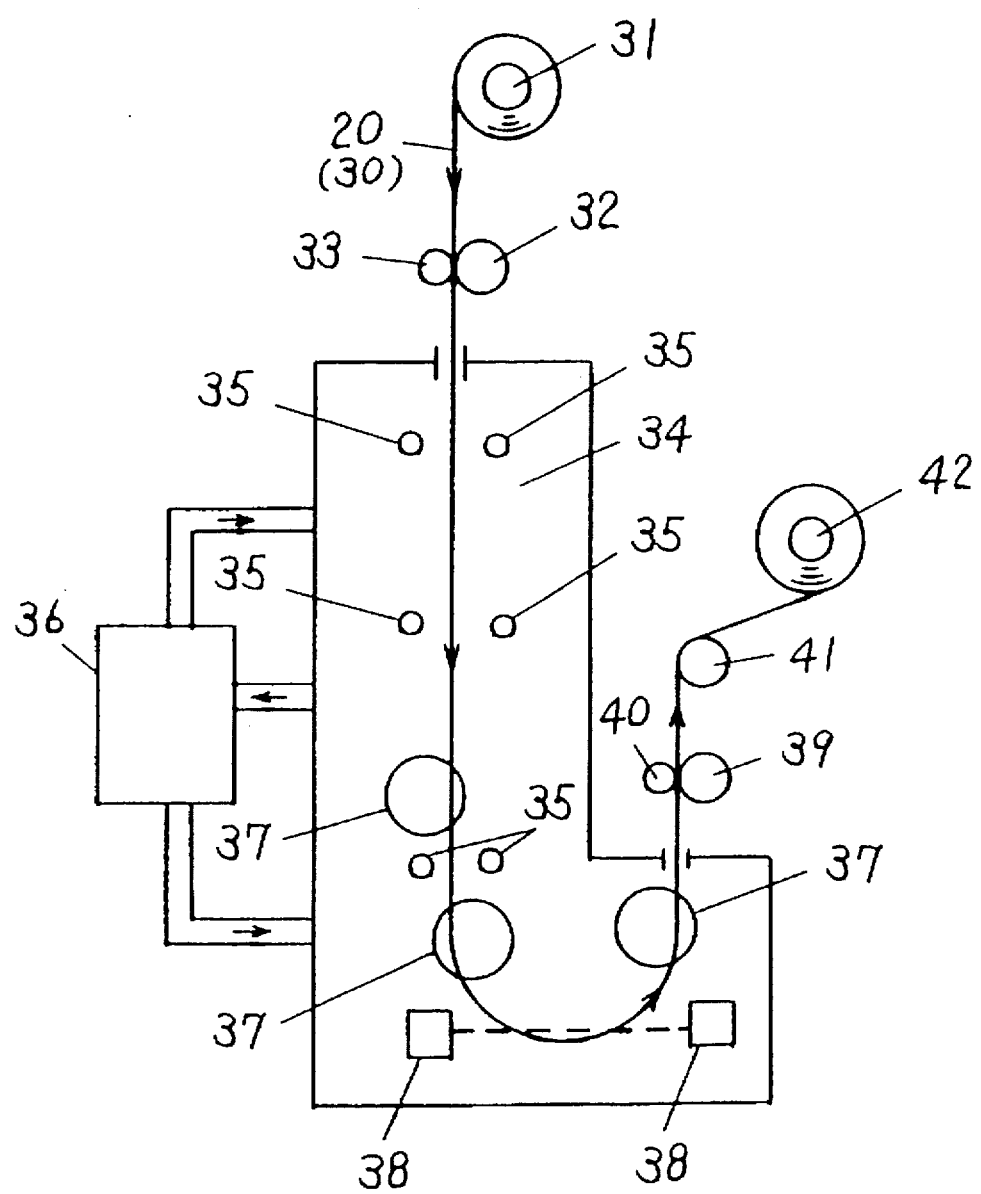
FIG. 3 schematically shows an apparatus for traveling annealing a magnetic recording medium according to the present invention.

FIG. 3 shows one example of an apparatus of the present invention, which is preferably used for carrying out the method for producing a magnetic recording medium according to the present invention.

The apparatus of FIG. 3 comprises a feeding roll 31, a supply roll 32, a rider roll 33, a constant temperature furnace 34, heaters 35, a generator of constant temperature air 36, width-controlling guides 37, a position-detecting sensor system 38, a take-up roll 39, a take-up rider roll 40, a pass roll 41, and a wind-up roll 42.

On the feeding roll 31, the coating type or thin metal film type magnetic recording medium 20 or 30, which is wound around a bobbin, is installed. A tension to be applied on the medium is adjusted in the range between 1 gf. and 100 gf. per 10 mm of width.

The supply roll 32 supplies the magnetic recording medium 20 or 30 at a constant rate, for example, in the range between 0.5 m/min. and 500 m/min.

The rider roll 33 prevents slip of the magnetic recording medium 20 or 30 over the supply roll 32.

The constant temperature furnace 34 provides an atmosphere of 50° C. or higher to the magnetic recording medium 20 or 30, and a temperature inside the furnace can be controlled in the range between 50° C. and 300° C.

The heaters 35 may be a far-infrared ray heater which can easily transmit heat inside the magnetic recording medium 20 or 30.

The generator of constant temperature air 36 supplies a hot air a temperature of which is regulated into the furnace 34. The use of the generator 36 together with the heater 35 can achieve more precise temperature control.

The width-controlling guides 37 prevent the shift of the magnetic recording medium 20 or 30 in the width direction. No support is provided in the width direction.

It is preferred to provide an air outlet having a slit or pores from which the constant temperature air is blown in a direction perpendicular to a forwarding direction of the magnetic recording medium 20 or 30, to prevent fluttering of the magnetic recording medium 20 or 30 caused by the constant temperature air flow from the generator 36.

The position-detecting sensor system 38 detects the lowest part of the magnetic recording medium 20 or 30 which sags by its own weight. In general, an optical sensor is used, since it can be easily operated.

The take-up roll 39 controls the drawing rate of the magnetic recording medium 20 or 30 by means of feed-back from the sensor system 38 so that the lowest part of the medium is kept at substantially the constant level. Plural sensors may be used for zone controlling.

The take-up roll 39 is positioned in an area where the temperature of the magnetic recording medium 20 or 30 is lower than 50° C.

The take-up rider roll 40 prevents the slip of the magnetic recording medium 20 or 30 over the take-up roll 39, as the rider roll 32 does.

The pass roll 41 changes the direction of the magnetic recording medium 20 or 30 towards the wind-up roll.

The wind-up roll 42 has an installed bobbin around which the magnetic recording medium 20 or 30 is wound. Like the supply roll 32, the wind-up roll 42 can adjust the tension and the rotation rate.

Now, the method of the production of the magnetic recording medium 20 or 30 according to the present invention will be illustrated with varying elements, materials and conditions by making reference to the following examples and the accompanying drawings, to explain how to determine the production conditions defined by the present invention.

EXAMPLE 1

As a non-magnetic substrate 1, there was used a polyethylene terephthalate film having a width of 500 mm, a thickness of 7 µm and a surface roughness $R_{max}$ of 150 Å on a side on which a coating type magnetic layer 2 was formed.

A coating paint was prepared by mixing 14 wt. parts of iron magnetic powder having a crystal size of about 200 Å and a coercive force of about 1800 Oe, 1 wt. part of carbon black (an antistatic agent), 2 wt. parts of alumina powder having an average particle size of 0.5 µm (an abrasive), 2 wt. parts of a mixture of a polar group-containing vinyl chloride copolymer, a polar group-containing polyurethane and a polyisocyanate in a weight ratio of 5:5:2 (a binder mixture), and 1 wt. part of a mixture of palmitic acid and butyl stearate in a weight ratio of 1:1 (a dispersant and a lubricant) in 80 wt. parts of a mixture of methyl ethyl ketone, cyclohexanone and toluene in a wight ratio of 3:1:3 to disperse them well.

The magnetic paint was coated on the surface of the non-magnetic substrate 1 having the above surface roughness by a reverse coater to a dry thickness of 3 µm, and dried at about 100° C. to form a coating type magnetic layer 2.

A back coat paint was prepared by mixing 4 wt. parts of a polyester resin, 3 wt. parts of nitrocellulose and 3 wt. parts of carbon black in 90 wt. parts of a mixed solvent of methyl ethyl ketone, cyclohexane and toluene in a weight ratio of 3:1:3.

The back coat paint was wet coated on the other surface of the substrate 1 to a dry thickness of about 0.5 µm and dried to form a back coat layer 3.

One of the functions of the back coat layer is to optimize the cupping of the magnetic recording medium 20 by adjusting the properties including the mechanical properties and the thickness of the medium.

The obtained magnetic recording medium 20 was calendered to further smooth the surface of the magnetic layer 2, and then installed on the feeding roll 31.

Herein, the treatment of the magnetic recording medium by the apparatus of FIG. 3 will be referred to as "traveling annealing".

The coating type magnetic recording medium 20 installed on the feeding roll 31 was supplied in the constant temperature furnace 34 at a constant rate by the supply roll 32 and the rider roll 33 while the tension was controlled at about 2 kgf per 500 mm width.

The temperature in the furnace 34 was kept constant by the heater 35 and the constant temperature air from the generator 36 of the constant temperature air.

Since the take-up tension on the magnetic recording medium 20 was 50 gr. per 500 mm width when it passed through the furnace 34, the shift of the recording medium 20 in the width direction was prevented by the width-controlling guide 37.

The lowest part of the magnetic recording medium 20 which sagged by its own weight was detected by the position-detecting sensor system 38, and the position of the lowest part was kept at substantially the same level by controlling the take-up rate by the take-up roll 39 and the take-up rider roll 40, whereby the tension applied on the magnetic recording medium 20 was adjusted to 1 gf. or less per 10 mm width.

The tension applied to the magnetic recording medium 29 which passed through the furnace 34 except the own weight of the medium was only 1 gf. or less per 10 mm. Then, the magnetic recording medium was in substantially the tension free state.

After passing over the take-up roll 39, the magnetic recording medium 20 was passed over the pass roll 41 and then wound around the bobbin which was installed in the wind-up roll 42. The winding up tension was about 1 kgf. per 500 mm width. Of course, the magnetic recording medium 20 which passed the take-up roll 39 was already cooled to around room temperature.

In this Example, nine samples of the magnetic recording medium were produced at a temperature of 120° C., 100° C. and 70° C. in the constant temperature furnace 34, in a residence time in the furnace 34 of 0.2, 0.3 and 0.5 second at 120° C.; 0.4, 0.5 and 0.8 second at 100° C.; and 1.0, 1.5 and 3.0 seconds at 70° C. These samples were designated as Sample Nos. 1–9, respectively.

Each of the samples of the magnetic recording media was slit by a slitting machine to form a tape having a width of 8 mm. Then, using a commercial Hi-8 cassette tape recorder (manufactured by Sony Corporation), a skew was measured. Also, using a measuring microscope, a thermal shrinkage factor was measured.

In relation to the skew measurement, the increase of an error rate should have been measured using a digital cassette tape recorder. But, no home-use digital video recorder was commercially available. Then, by taking into account the results obtained using a prototype recorder having, as possible specifications, a track pitch of 6 µm, a shortest recording wavelength of 0.5 µm, a relative speed of 9 m/sec. and an Azimuth angle of 10 degrees, as well as an error caused by an accuracy of the mechanism and deterioration of a C/N ratio by transposition, a track shift of the magnetic recording tape should have been 1 µm or less to prevent the increase of the error rate. When this track shift was converted to a value in the Hi-8 cassette tape recorder, the skew should be 6 µsec. or less, and the thermal shrinkage factor should be 0.04% or less. To achieve such skew and thermal shrinkage factor, the experiments were done.

The skew was measured as follows:

The obtained magnetic tape was set in a 60 minute long cassette, and image signals were recorded over the whole tape length using the above commercially available Hi-8 cassette video recorder at 23° C., 50% RH. After storing the cassette in which the tape was wound on the supply reel at 60° C., 50% RH for 24 hours, the skew was measured using the same recorder at 23° C., 50% RH. As the skew, the maximum value measured in 60 minute reproduction of the signals was used.

The thermal shrinkage factor was measured as follows:

The magnetic recording tape was maintained in a tension free state at 60° C., 50% RH for 24 hours. Before and after this period, the tape length between two marks on the tape was measured, and a change of the length was calculated.

Comparative Example 1A, 1B and 1C

In Comparative Example 1A, the magnetic recording medium which had not been subjected to the travelling annealing was used.

In Comparative Examples 1B and 1C, the magnetic recording medium was subjected to the travelling annealing treatment using the apparatus of FIG. 3 which was modified to have a roll at a position corresponding to the lowest part of the magnetic recording medium to apply a tension, under the tension of 10 gf. per 10 mm width (1B) or 100 gf. per 10 mm width (1C).

Then, a magnetic tape was produced from each magnetic recording medium and subjected to the same measurements as in Example 1.

The conditions and results of Example 1 and Comparative Examples 1A, 1B and 1C are shown in Table 1.

TABLE 1

| | Treating conditions | | | | Skew after 60° C., 50% RH × 24 hrs. (μsec.) (rank) | Thermal shrinkage percentage (%) |
|---|---|---|---|---|---|---|
| | Traveling annealing | | Heated roll treatment | | | |
| Sample No. or C. Ex. No. | Temp (°C.) | Residence time (sec.) | Temp. (°C.) | Treating time (sec.) | | |
| 1 | 120 | 0.2 | — | — | 7.0 (X) | 0.060 |
| 2 | 120 | 0.3 | — | — | 5.5 (Δ) | 0.040 |
| 3 | 120 | 0.5 | — | — | 4.5 (○) | 0.035 |
| 4 | 100 | 0.4 | — | — | 8.0 (X) | 0.065 |
| 5 | 100 | 0.5 | — | — | 6.0 (Δ) | 0.040 |
| 6 | 100 | 0.8 | — | — | 5.0 (○) | 0.037 |
| 7 | 70 | 1.0 | — | — | 8.0 (X) | 0.070 |
| 8 | 70 | 1.5 | — | — | 5.5 (Δ) | 0.039 |
| 9 | 70 | 3.0 | — | — | 4.0 (○) | 0.033 |
| C.1A | — | — | — | — | 25 (X) | 0.165 |
| C.1B | 100 | 0.8 | — | — | 23 (X) | 0.160 |
| C.1C | 100 | 0.8 | — | — | 25 (X) | 0.164 |

As seen from the results of Table 1, all the samples of Example 1 had the greatly improved skew and thermal shrinkage percentage in comparison with the samples of Comparative Examples 1A, 1B and 1C. These results confirm that the treatment according to the present invention is very effective when the polyethylene terephthalate is used as the substrate 1.

When the tension which is the same as that applied to the magnetic recording medium in the conventional treating method, that is, 100 gf. per 10 mm width (Comparative Example 1C), the skew was never improved. In addition, when the tension which is one tenth of that applied to the magnetic recording medium in the conventional treating method, that is, 10 gf. per 10 mm width (Comparative Example 1B) was applied, the skew was not appreciably improved.

Figure 4:
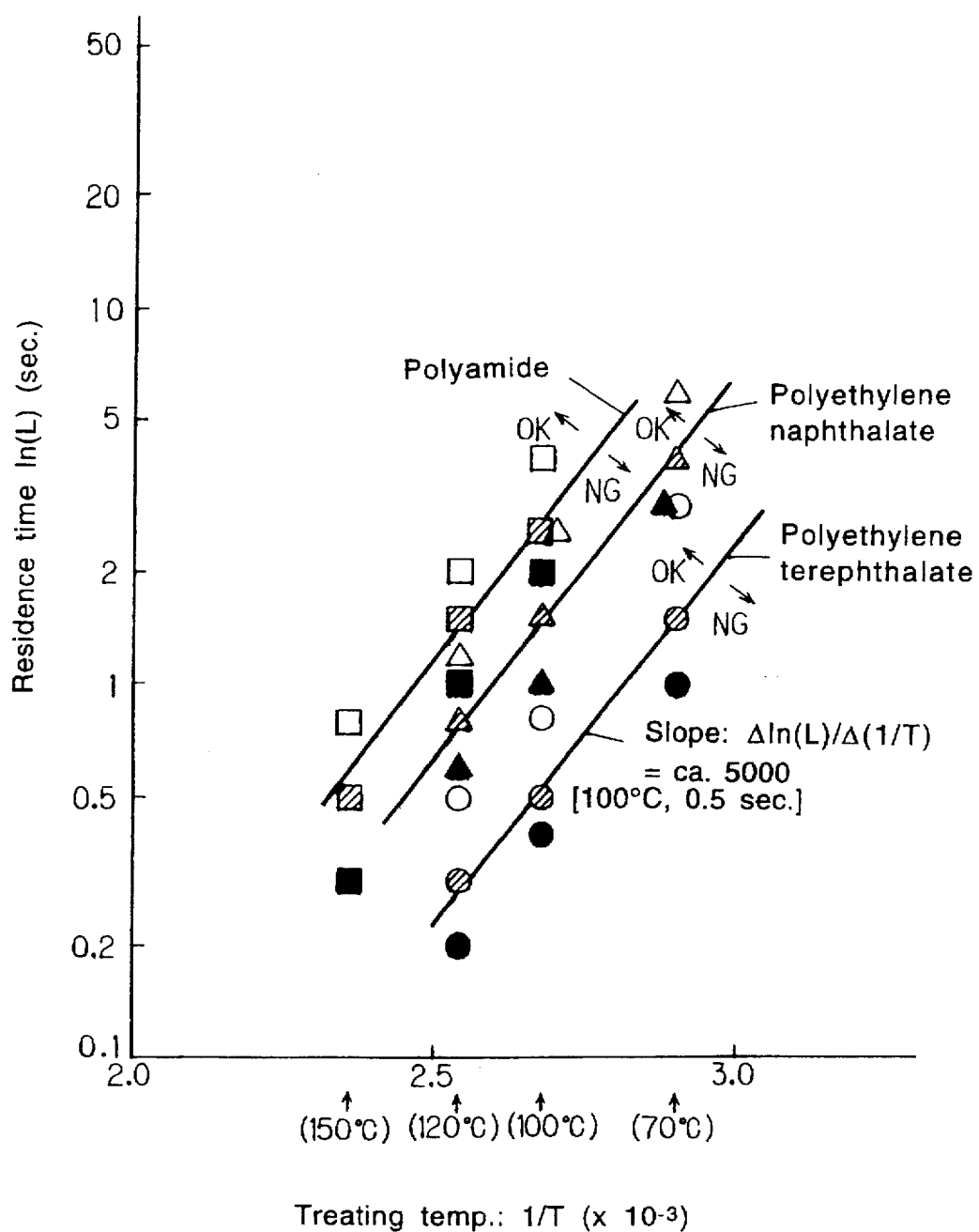
FIG. 4 is a graph showing a relationship between a treating temperature and a treating time in the traveling annealing treatment.

The above conditions and the results are plotted in FIG. 4.

In FIG. 4, the circles represent the results when the polyethylene terephthalate film was used as the substrate. (Examples 1 and 4), the triangles represent the results when the polyethylene naphthalate film was used as the substrate (Examples 2 and 5), and squares represent the results when the polyamide film was used as the substrate (Examples 3 and 6), and the white circles, triangles and squares mean that the skew was good (○), the hatched ones mean that the skew was fair (Δ), and the black ones mean that the skew was bad (X).

From FIG. 4, it is understood that, the treating time in the traveling annealing under the very small tension is preferably at least 0.5 second at 100° C., and the slope of the boundary line is about 5000, and that the traveling annealing is to be carried out under the conditions in the area on or above this boundary line. Further, it is understood that the residence time is preferably at least 0.8 second at 100° C.

EXAMPLE 2

In the same manner as in Example 1 except that a polyethylene naphthalate film was used as the substrate 1 in place of the polyethylene terephthalate, and a residence time in the furnace 34 was chosen to be 0.6, 0.8 and 1.2 seconds at 120° C.; 1.0, 1.5 and 2.0 seconds at 100° C.; and 3, 4 and 6 seconds at 70° C., nine samples of the magnetic tapes were produced (Sample Nos. 11–19), and subjected to the same measurements.

Comparative Examples 2A, 2B and 2C

In the same manner as in Comparative Examples 1A, 1B and 1C except that a polyethylene naphthalate film was used as the substrate 1 in place of the polyethylene terephthalate, the same experiments were carried out.

The conditions and results of Example 2 and Comparative Examples 2A, 2B and 2C are shown in Table 2.

TABLE 2

| | Treating conditions | | | | Skew after 60° C., 50% RH × 24 hrs. (μsec.) (rank) | Thermal shrinkage rate (%) |
|---|---|---|---|---|---|---|
| | Traveling annealing | | Heated roll treatment | | | |
| Sample No. or C. Ex. No. | Temp (°C.) | Residence time (sec.) | Temp. (°C.) | Treating time (sec.) | | |
| 11 | 120 | 0.6 | — | — | 6.5 (X) | 0.055 |
| 12 | 120 | 0.8 | — | — | 5.5 (Δ) | 0.039 |
| 13 | 120 | 1.2 | — | — | 4.0 (○) | 0.033 |
| 14 | 100 | 1.0 | — | — | 7.0 (X) | 0.060 |
| 15 | 100 | 1.5 | — | — | 5.5 (Δ) | 0.040 |
| 16 | 100 | 2.5 | — | — | 4.5 (○) | 0.036 |
| 17 | 70 | 3.0 | — | — | 7.5 (X) | 0.065 |
| 18 | 70 | 4.0 | — | — | 6.0 (Δ) | 0.040 |

TABLE 2-continued

| | Treating conditions | | | | | |
|---|---|---|---|---|---|---|
| | Traveling annealing | | Heated roll treatment | | Skew after 60° C., | Thermal |
| Sample No. or C. Ex. No. | Temp (°C.) | Residence time (sec.) | Temp. (°C.) | Treating time (sec.) | 50% RH × 24 hrs. (μsec.) (rank) | shrinkage rate (%) |
| 19 | 70 | 6.0 | — | — | 4.5 (○) | 0.035 |
| C.2A | — | — | — | — | 35 (X) | 0.205 |
| C.2B | 100 | 2.5 | — | — | 30 (X) | 0.185 |
| C.2C | 100 | 2.5 | — | — | 33 (X) | 0.190 |

As seen from the results of Table 2, all the samples of Example 2 had the greatly improved skew and thermal shrinkage percentage in comparison with the samples of Comparative Examples 2A, 2B and 2C. These results confirm that the treatment according to the present invention is very effective when the polyethylene naphthalate is used as the substrate 1.

When the tension which is the same as that applied to the magnetic recording medium in the conventional treating method, that is, 100 gf. per 10 mm width (Comparative Example 2C), the skew was never improved. In addition, when the tension which is one tenth of that applied to the magnetic recording medium in the conventional treating method, that is, 10 gf. per 10 mm width (Comparative Example 2B) was applied, the skew was not appreciably improved.

The residence times in Example 2 were longer than those in Example 1. This is partly because the polyethylene naphthalate has the larger thermal shrinkage factor than that of the polyethylene terephthalate, and partly because the former has the higher glass transition temperature than the latter.

EXAMPLE 3

In the same manner as in Example I except that a polyamide film was used as the substrate 1 in place of the polyethylene terephthalate, an annealing temperature was changed to 150° C., 120° C. and 100° C., and a residence time in the furnace 34 was chosen to be 0.3, 0.5 and 0.8 second at 150° C.; 1:0, 1.5 and 2.0 seconds at 120° C.; and 2.0, 2.5 and 4.0 seconds at 100° C., nine samples of the magnetic tapes were produced (Sample Nos. 21–29), and subjected to the same measurements.

Comparative Examples 3A, 3B and 3C

In the same manner as in Comparative Examples 1A, 1B and 1C except that a polyamide film was used as the substrate 1 in place of the polyethylene terephthalate, the same experiments were carried out.

The conditions and results of Example 3 and Comparative Examples 3A, 3B and 3C are shown in Table 3.

TABLE 3

| | Treating conditions | | | | | |
|---|---|---|---|---|---|---|
| | Traveling annealing | | Heated roll treatment | | Skew after 60° C., | Thermal |
| Sample No. or C. Ex. No. | Temp (°C.) | Residence time (sec.) | Temp. (°C.) | Treating time (sec.) | 50% RH × 24 hrs. (μsec.) (rank) | shrinkage percentage (%) |
| 21 | 150 | 0.3 | — | — | 7.0 (X) | 0.065 |
| 22 | 150 | 0.5 | — | — | 6.0 (Δ) | 0.040 |
| 23 | 150 | 0.8 | — | — | 5.0 (○) | 0.038 |
| 24 | 120 | 1.0 | — | — | 7.5 (X) | 0.063 |
| 25 | 120 | 1.5 | — | — | 6.0 (Δ) | 0.040 |
| 26 | 120 | 2.0 | — | — | 4.5 (○) | 0.037 |
| 27 | 100 | 2.0 | — | — | 8.0 (X) | 0.075 |
| 28 | 100 | 2.5 | — | — | 6.0 (Δ) | 0.040 |
| 29 | 100 | 4.0 | — | — | 5.0 (○) | 0.037 |
| C.3A | — | — | — | — | 20 (X) | 0.150 |
| C.3B | 120 | 2.0 | — | — | 18 (X) | 0.139 |
| C.3C | 120 | 2.0 | — | — | 20 (X) | 0.145 |

The above conditions and the results are plotted in FIG. 4.

From FIG. 4, it is understood that, the treating time in the traveling annealing under the very small tension is preferably at least 1.5 seconds at 100° C., and the slope of the boundary line is about 5000, and that the traveling annealing is to be carried out under the conditions in the area on or above this boundary line. Further, it is understood that the residence time is preferably at least 2.5 seconds at 100° C.

As seen from the results of Table 3, all the samples of Example 3 had the greatly improved skew and thermal shrinkage percentage in comparison with the samples of Comparative Examples 3A, 3B and 3C. These results confirm that the treatment according to the present invention is very effective when the polyamide is used as the substrate 1.

When the tension which is the same as that applied to the magnetic recording medium in the conventional treating method, that is, 100 gf. per 10 mm width (Comparative Example 3C), the skew was never improved. In addition, when the tension which is one tenth of that applied to the magnetic recording medium in the conventional treating method, that is, 10 gf. per 10 mm width (Comparative Example 3B) was applied, the skew was not appreciably improved.

The above conditions and the results are plotted in FIG. 4.

From FIG. 4, it is understood that, the treating time in the traveling annealing under the very small tension is preferably at least 2.5 seconds at 100° C., and the slope of the boundary line is about 5000, and that the traveling annealing is to be carried out under the conditions in the area on or above this boundary line. Further, it is understood that the residence time is preferably at least 4 seconds at 100° C.

EXAMPLE 4

In this Example, a thin metal film type magnetic recording medium of FIG. 2, which was produced in the following method, was used in place of the coating type magnetic recording medium of Example 1.

The thin metal film type magnetic recording medium was produced as follows:

On one surface of the same polyethylene terephthalate film as used in Example 1, a ferromagnetic metal film 4 comprising cobalt and having a thickness of about 1500 Å was formed by vacuum depositing cobalt while supplying oxygen gas.

On the ferromagnetic metal layer 4, a diamond-like carbon film having a thickness of about 100 Å was formed by the plasma CVD method using a mixed gas of argon and methane, and then on the diamond-like film, a lubricant layer having a thickness of about 30 Å, was formed by coating a solution of a fluorine-containing carboxylic acid in isopropanol and drying it.

The back coat layer 3 was formed on the other surface of the substrate 1 in the same way as in Example 1.

Some of the samples were treated by a heated roll at 120° C. for 10 seconds. The reason why these treating conditions were selected is that the aging of the magnetic properties and the corrosion resistance are not improved by the heated roll treatment at 60° C., but as the temperature is raised from 60° C., those properties are gradually improved, and the above conditions seem to be most effective in the industrial production.

Thereafter, in the same manner as in Example 1 except that annealing temperatures of 120° C. and 100° C. were employed while the residence times at each temperature were the same at each temperature, the twelve samples of the magnetic tapes, half of which were treated by the heated roll, were produced (Sample Nos. 31–42), and subjected to the same measurements as in Example 1 and also evaluated on their changes of the magnetic properties with time and corrosion resistance.

The change of the magnetic properties with time was evaluated by measuring a coercive force after maintaining the thin metal film type magnetic recording tape which was installed in a cassette at 40° C., 50% RH for one week, and comparing the measured coercive force with the coercive force of the tape just after the production. When the change rate was within 5%, the sample was ranked good, since such small change of the coercive force had no material influence on the recording and reproducing property of the magnetic tape. Preferably, this change rate is 3% or less. When the change of the coercive force is large, the recording and reproducing property of the magnetic tape is adversely influenced, and there will be some difficulty in inspecting and selecting the magnetic tapes just after the production, which causes a big problem in the industrial scale production.

The corrosion resistance was evaluated by placing the magnetic tape in an atmosphere at 60° C., 90% RH for 3 days, and observing the surface condition of the magnetic tape with an optical microscope. When no dotted lust was found, the magnetic tape was ranked good.

Comparative Examples 4A, 4B and 4C

In Comparative Example 4A, the magnetic recording medium which had not been subjected to the heated roll treatment or the travelling annealing was used.

In Comparative Example 4B, the magnetic recording medium which had been subjected only to the heated roll treatment was used.

In Comparative Examples 4C and 4D, the magnetic recording medium was subjected to the heated roll treatment and then to the travelling annealing using the apparatus of FIG. 3 which was modified in the same way as in Comparative Examples 1A, 1B and 1C under the tension of 10 gf. per 10 mm width (4C) or 100 gf. per 10 mm width (4D).

Then, the samples were subjected to the same measurements and evaluations as in Example 4.

The conditions and results of Example 4 and Comparative Examples 4A, 4B and 4C are shown in Table 4.

TABLE 4

| | Production conditions | | | | | | | |
| | Traveling annealing | | Heated roll treatment | | Skew after 60° C., | Thermal | Change of | |
| Sample No. or C. Ex. No. | Temp. (°C.) | Residence time (sec.) | Temp. (°C.) | treating time (sec.) | 50% RH for 24 hrs. (μsec.) (rank) | shrinkage percentage (%) | coercive force (%) (rank) | Corrosion resistance |
|---|---|---|---|---|---|---|---|---|
| 31 | 120 | 0.2 | — | — | 7.5 (X) | 0.065 | 8 (X) | X |
| 32 | 120 | 0.3 | — | — | 6.0 (Δ) | 0.040 | 7 (X) | X |
| 33 | 120 | 0.5 | — | — | 5.0 (O) | 0.038 | 6 (X) | X–O |
| 34 | 120 | 0.2 | 120 | 10 | 7.0 (X) | 0.060 | 3 (O) | O |
| 35 | 120 | 0.3 | 120 | 10 | 5.5 (Δ) | 0.039 | 3 (O) | O |
| 36 | 120 | 0.5 | 120 | 10 | 4.5 (O) | 0.035 | 2 (O) | O |
| 37 | 100 | 0.4 | — | — | 8.5 (X) | 0.076 | 9 (X) | X |
| 38 | 100 | 0.5 | — | — | 6.5 (X) | 0.043 | 7.5 (X) | X |

TABLE 4-continued

| | Production conditions | | | | | | | |
|---|---|---|---|---|---|---|---|---|
| | Traveling annealing | | Heated roll treatment | | Skew after 60° C., | Thermal | Change of | |
| Sample No. or C. Ex. No. | Temp. (°C.) | Residence time (sec.) | Temp. (°C.) | treating time (sec.) | 50% RH for 24 hrs. (μsec.) (rank) | shrinkage percentage (%) | coercive force (%) (rank) | Corrosion resistance |
| 39 | 100 | 0.8 | — | — | 4.5 (○) | 0.036 | 6.5 (X) | X |
| 40 | 100 | 0.4 | 120 | 10 | 8.0 (X) | 0.070 | 4 (Δ) | ○ |
| 41 | 100 | 0.5 | 120 | 10 | 6.0 (Δ) | 0.041 | 3 (○) | ○ |
| 42 | 100 | 0.8 | 120 | 10 | 4.0 (○) | 0.033 | 3 (○) | ○ |
| C.4A | — | — | — | — | 35 (X) | 0.220 | 10 (X) | X |
| C.4B | — | — | 120 | 10 | 18 (X) | 0.135 | 6 (X) | X |
| C.4C | 100 | 0.8 | 120 | 10 | 15 (X) | 0.125 | 5 (Δ) | ○ |
| C.4D | 100 | 0.8 | 120 | 10 | 17 (X) | 0.132 | 5 (Δ) | ○ |

As seen from the results of Table 4, the samples of Example 4 which were treated only by the traveling annealing had the greatly improved skew and thermal shrinkage factor in comparison with the samples of Comparative Examples 4A, 4B, 4C and 4D. But, the samples of Example 4 which were not treated by the heated roll suffered from the large change of the coercive force with time. Then, the final properties could not be predicted just after the production. In addition, those samples had insufficient corrosion resistance.

When the tension which is the same as that applied to the magnetic recording medium in the conventional treating method, that is, 100 gf. per 10 mm width (Comparative Example 4D), the skew was never improved. In addition, when the tension which is one tenth of that applied to the magnetic recording medium in the conventional treating method, that is, 10 gf. per 10 mm width (Comparative Example 4C) was applied, the skew was not appreciably improved.

When the traveling annealing under the very small tension and the heated roll treatment were combined, not only the skew and the thermal shrinkage percentage were improved, but also the change of the magnetic property (coercive force) with time and the corrosion resistance were satisfactory.

In Example 4 and also in following Examples 5 and 6, the heated roll treatment was carried out after the formation of the protective layer 6. It is possible to carry out the heated roll treatment at any stage after the formation of the ferromagnetic metal layer 4. To minimize the troubles in the production, the heated roll treatment is preferably carried out after the traveling annealing treatment.

While, in Example 4 and also Examples 5 and 6, the heated roll treatment and the traveling annealing treatment were carried out each one time, it is possible to carry out each treatment twice or more.

The above conditions and the results are plotted in FIG. 4.

From FIG. 4, it is understood that, the treating time in the traveling annealing under the very small tension is preferably at least 0.5 seconds at 100° C., and the slope of the boundary line is about 5000, and that the traveling annealing is to be carried out under the conditions in the area on or above this boundary line. Further, it is understood that the residence time is preferably at least 0.8 seconds at 100° C.

Example 5

In the same manner as in Example 4 except that a polyethylene naphthalate film was used as the substrate in place of the polyethylene terephthalate, the conditions of the heated roll treatment were changed to 130° C. and 10 seconds, and a residence time in the furnace 34 was chosen to be 0.6, 0.8 and 1.2 seconds at 120° C.; and 1.0, 1.5 and 2.5 seconds at 100° C., twelve samples of the magnetic tapes were produced (Sample Nos. 51–62), and subjected to the same measurements.

Comparative Examples 5A to 5D

In the same manner as in Comparative Examples 4A to 4D except that a polyethylene naphthalate film was used as the substrate in place of the polyethylene terephthalate, the same experiments were carried out.

The conditions and results of Example 4 and Comparative Examples 4A to 4D are shown in Table 5.

TABLE 5

| | Production conditions | | | | | | | |
|---|---|---|---|---|---|---|---|---|
| | Traveling annealing | | Heated roll treatment | | Skew after 60° C., | Thermal | Change of | |
| Sample No. or C. Ex. No. | Temp. (°C.) | Residence time (sec.) | Temp. (°C.) | treating time (sec.) | 50% RH for 24 hrs. (μsec.) (rank) | shrinkage percentage (%) | coercive force (%) (rank) | Corrosion resistance |
| 51 | 120 | 0.6 | — | — | 7.0 (X) | 0.063 | 9 (X) | X |
| 52 | 120 | 0.6 | — | — | 5.5 (○) | 0.038 | 8 (X) | X |
| 53 | 120 | 1.2 | — | — | 4.5 (○) | 0.030 | 7 (X) | X–○ |
| 54 | 120 | 0.6 | 130 | 10 | 6.5 (X) | 0.056 | 4 (Δ) | ○ |
| 55 | 120 | 0.8 | 130 | 10 | 5.0 (○) | 0.038 | 3 (○) | ○ |

TABLE 5-continued

| | Production conditions | | | | | | | |
|---|---|---|---|---|---|---|---|---|
| | Traveling annealing | | Heated roll treatment | | Skew after 60° C., 50% RH for 24 hrs. (μsec.) (rank) | Thermal shrinkage percentage (%) | Change of coercive force (%) (rank) | Corrosion resistance |
| Sample No. or C. Ex. No. | Temp. (°C.) | Residence time (sec.) | Temp. (°C.) | treating time (sec.) | | | | |
| 56 | 120 | 1.2 | 130 | 10 | 4.0 (○) | 0.032 | 2 (○) | ○ |
| 57 | 100 | 1.0 | — | — | 7.5 (X) | 0.070 | 10 (X) | X |
| 58 | 100 | 1.5 | — | — | 6.0 (Δ) | 0.041 | 8 (X) | X |
| 59 | 100 | 2.5 | — | — | 5.0 (○) | 0.037 | 7 (X) | X |
| 60 | 100 | 1.0 | 130 | 10 | 6.5 (X) | 0.060 | 4 (Δ) | ○ |
| 61 | 100 | 1.5 | 130 | 10 | 5.0 (○) | 0.037 | 3 (○) | ○ |
| 62 | 100 | 2.5 | 130 | 10 | 4.0 (○) | 0.032 | 3 (○) | ○ |
| C.5A | — | — | — | — | 42 (X) | 0.250 | 11 (X) | X |
| C.5B | — | — | 130 | 10 | 33 (X) | 0.195 | 7 (X) | ○ |
| C.5C | 100 | 2.5 | 130 | 10 | 30 (X) | 0.180 | 5 (Δ) | ○ |
| C.5D | 100 | 2.5 | 130 | 10 | 32 (X) | 0.190 | 5 (Δ) | ○ |

As seen from the results of Table 5, the samples of Example 5 which were treated only by the traveling annealing had the greatly improved skew and thermal shrinkage factor in comparison with the samples of Comparative Examples 5A, 5B, 5C and 5D, when the polyethylene naphthalate film was used as the substrate. But, the samples of Example 5 which were not treated by the heated roll suffered from the large change of the coercive force with time. Then, the final properties could not be predicted just after the production. In addition, those samples had insufficient corrosion resistance.

When the tension which is the same as that applied to the magnetic recording medium in the conventional treating method, that is, 100 gf. per 10 mm width (Comparative Example 5D), the skew was never improved. In addition, when the tension which is one tenth of that applied to the magnetic recording medium in the conventional treating method, that is, 10 gf. per 10 mm width (Comparative Example 5C) was applied, the skew was not appreciably improved.

When the traveling annealing under the very small tension and the heated roll treatment were combined, not only the skew and the thermal shrinkage percentage were improved, but also the change of the magnetic property (coercive force) with time and the corrosion resistance were satisfactory.

The above conditions and the results are plotted in FIG. 4.

From FIG. 4, it is understood that, the treating time in the traveling annealing under the very small tension is preferably at least 1.5 seconds at 100° C., and the slope of the boundary line is about 5000, and that the traveling annealing is to be carried out under the conditions in the area on or above this boundary line. Further, it is understood that the residence time is preferably at least 2.5 seconds at 100° C.

EXAMPLE 6

In the same manner as in Example 4 except that a polyamide film was used as the substrate in place of the polyethylene terephthalate, the conditions of the heated roll treatment were changed to 150° C. and 10 seconds, and a residence time in the furnace 34 was chosen to be 1.0, 1.5 and 2.0 seconds at 120° C.; and 2.0, 2.5 and 4.0 seconds at 100° C., twelve samples of the magnetic tapes were produced (Sample Nos. 71–82), and subjected to the same measurements.

Comparative Examples 6A to 6D

In the same manner as in Comparative Examples 4A to 4D except that a polyamide film was used as the substrate in place of the polyethylene terephthalate, the same experiments were carried out.

The conditions and results of Example 6 and Comparative Examples 6A to 6D are shown in Table 6.

TABLE 6

| | Production conditions | | | | | | | |
|---|---|---|---|---|---|---|---|---|
| | Traveling annealing | | Heated roll treatment | | Skew after 60° C., 50% RH for 24 hrs. (μsec.) (rank) | Thermal shrinkage percentage (%) | Change of coercive force (%) (rank) | Corrosion resistance |
| Sample No. or C. Ex. No. | Temp. (°C.) | Residence time (sec.) | Temp. (°C.) | treating time (sec.) | | | | |
| 71 | 120 | 1.0 | — | — | 7.5 (X) | 0.068 | 9 (X) | X |
| 72 | 120 | 1.5 | — | — | 6.5 (X) | 0.045 | 7 (X) | X |
| 73 | 120 | 2.0 | — | — | 5.0 (○) | 0.038 | 6 (X) | X |
| 74 | 120 | 1.0 | 150 | 10 | 6.0 (Δ) | 0.040 | 3 (○) | ○ |
| 75 | 120 | 1.5 | 150 | 10 | 5.0 (○) | 0.037 | 3 (○) | ○ |
| 76 | 120 | 2.0 | 150 | 10 | 4.5 (○) | 0.034 | 2 (○) | ○ |
| 77 | 100 | 2.0 | — | — | 8.5 (X) | 0.078 | 10 (X) | X |
| 78 | 100 | 2.5 | — | — | 6.5 (X) | 0.044 | 9 (X) | X |

TABLE 6-continued

| | Production conditions | | | | | | | |
|---|---|---|---|---|---|---|---|---|
| | Traveling annealing | | Heated roll treatment | | Skew after 60° C., | Thermal | Change of | |
| Sample No. or C. Ex. No. | Temp. (°C.) | Residence time (sec.) | Temp. (°C.) | treating time (sec.) | 50% RH for 24 hrs. (μsec.) (rank) | shrinkage percentage (%) | coercive force (%) (rank) | Corrosion resistance |
| 79 | 100 | 4.0 | — | — | 5.5 (Δ) | 0.039 | 7 (X) | X |
| 80 | 100 | 2.0 | 150 | 10 | 7.5 (X) | 0.070 | 4 (Δ) | X–O |
| 81 | 100 | 2.5 | 150 | 10 | 5.5 (Δ) | 0.039 | 3 (O) | O |
| 82 | 100 | 4.0 | 150 | 10 | 5.0 (O) | 0.036 | 2 (O) | O |
| C.6A | — | — | — | — | 35 (X) | 0.225 | 12 (X) | X |
| C.6B | — | — | 150 | 10 | 22 (X) | 0.150 | 8 (X) | O |
| C.6C | 120 | 2.0 | 150 | 10 | 20 (X) | 0.145 | 4 (Δ) | O |
| C.6D | 120 | 2.0 | 150 | 10 | 20 (X) | 0.147 | 4 (Δ) | O |

As seen from the results of Table 6, the samples of Example 6 which were treated only by the traveling annealing had the greatly improved skew and thermal shrinkage factor in comparison with the samples of Comparative Examples 6A, 6B, 6C and 6D, when the polyamide film was used as the substrate. But, the samples of Example 6 which were not treated by the heated roll suffered from the large change of the coercive force with time. Then, the final properties could not be predicted just after the production. In addition, those samples had insufficient corrosion resistance.

When the tension which is the same as that applied to the magnetic recording medium in the conventional treating method, that is, 100 gf. per 10 mm width (Comparative Example 6D), the skew was never improved. In addition, when the tension which is one tenth of that applied to the magnetic recording medium in the conventional treating method, that is, 10 gf. per 10 mm width (Comparative Example 6C) was applied, the skew was not appreciably improved.

When the traveling annealing under the very small tension and the heated roll treatment were combined, not only the skew and the thermal shrinkage percentage were improved, but also the change of the magnetic property (coercive force) with time and the corrosion resistance were satisfactory.

The above conditions and the results are plotted in FIG. 4.

From FIG. 4, it is understood that, the treating time in the traveling annealing under the very small tension is preferably at least 2.5 seconds at 100° C., and the slope of the boundary line is about 5000, and that the traveling annealing is to be carried out under the conditions in the area on or above this boundary line. Further, it is understood that the residehoe time is preferably at least 4.0 seconds at 100° C.

From the results of Examples 4, 5 and 6, it is confirmed that the combination of the traveling annealing under the very small tension and the heated roll treatment is effeotive to deorease the skew, and improve the ohange of the magnetic property with time and corrosion resistance.

If the magnetic recording medium 30 which is wound around the bobbin is treated by the combination of roll annealing under the very small tension and the heated roll treatment, some properties may be improved, but the thermal shrinkage percentage is different between the inside and the outside of the bobbin, so that the skew varies along the length of the magnetic recording medium, and the absolute values of the skew are larger. Then, the traveling annealling is better than the roll annealing, sine the former achieves the small skew and suppresses the variation of the skew.

What is claimed is:

1. A method for producing a magnetic recording medium comprising treating a magnetic recording medium which comprises a non-magnetic substrate and a magnetic layer formed on said substrate rate in an atmosphere kept at a temperature of at least 50° C., with applying a tension of 1 gf. or less per 10 mm width to said magnetic recording medium in a treating time which is in a range on or above a line having a slope of at least 5000 in terms of $\Delta \ln(L)/\Delta(1/T)$ and passing a point of 0.5 second at 100° C., when a natural logarithm of a residence time L (hours) $\{\ln(L)\}$ is Arrhenius plotted against an inverse of an absolute temperature T (1/T), where $\Delta \ln(L)/\Delta(1/T)$ is derived from $\{\ln(L_1)-\ln(L_2)\}/\{(1/T_1)-(1/T_2)\}$ in which $L_1$ and $L_2$ are two different residence times at the absolute temperatures $T_1$ and $T_2$.

2. The method according to claim 1, wherein said magnetic layer is a ferromagnetic metal layer.

3. A method for producing a magnetic recording medium comprising steps of treating a magnetic recording medium which comprises a non-magnetic substrate and a ferromagnetic metal layer formed on said substrate in an atmosphere kept at a temperature of at least 50° C., with applying a tension of 1 gf. or less per 10 mm width to said magnetic recording medium in a treating time which is in a range on or above a line having a slope of at least 5000 in terms of $\Delta \ln(L)/\Delta(1/T)$ and passing a point of 0.5 second at 100° C., when a natural logarithm of a residence time L (hours) $\{\ln(L)\}$ is Arrhenius plotted against an inverse of an absolute temperature T (1T), where $\Delta \ln(L)/\Delta(1/T)$ is derived from $\{\ln(L_1)-\ln(L_2)\}/\{(1/T_1)-(1/T_2)\}$ in which $L_1$ and $L_2$ are two different residence times at the absolute temperatures $T_1$ and $T_2$, and heating said medium over a heated roll kept at a temperature of at least 60° C. with contacting said medium to said roll, where said treatment in the atmosphere kept at a temperature of at least 50° C. and said heating over the heated roll are carried out at least one time.

4. The method according to claim 3 wherein said treatment in the atmosphere kept at a temperature of at least 50° C. is carried out after said heating over the heated roll.

* * * * *